United States Patent
Shinha et al.

(10) Patent No.: US 9,618,825 B2
(45) Date of Patent: Apr. 11, 2017

(54) PROJECTOR AND METHOD FOR CONTROLLING PROJECTOR WITH CHANGING CONTENT

(71) Applicant: SEIKO EPSON CORPORATION, Tokyo (JP)

(72) Inventors: Hiroaki Shinha, Mastsukawa-mura (JP); Koichi Miyasaka, Matsumoto (JP); Hirofumi Kasuga, Matsumoto (JP); Tadashi Kinebuchi, Okaya (JP); Shuji Narimatsu, Suwa (JP); Hidehito Iisaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 176 days.

(21) Appl. No.: 14/335,127

(22) Filed: Jul. 18, 2014

(65) Prior Publication Data

US 2015/0029406 A1    Jan. 29, 2015

(30) Foreign Application Priority Data

Jul. 23, 2013 (JP) ................. 2013-152319

(51) Int. Cl.
  *G03B 21/14* (2006.01)
  *G03B 7/26* (2006.01)
  *H04N 5/63* (2006.01)
  *H04N 9/31* (2006.01)
  *H04N 5/66* (2006.01)

(52) U.S. Cl.
  CPC ............. *G03B 7/26* (2013.01); *G03B 21/14* (2013.01); *H04N 5/63* (2013.01); *H04N 5/66* (2013.01); *H04N 9/3141* (2013.01)

(58) Field of Classification Search
  CPC .......... H04N 5/63; H04N 5/66; H04N 9/3141; G03B 21/14; G03B 7/26
  See application file for complete search history.

(56) References Cited

U.S. PATENT DOCUMENTS

| 2002/0154145 A1* | 10/2002 | Isakovic | G06T 17/00 345/643 |
| 2011/0148212 A1* | 6/2011 | Kotani | G03B 21/14 307/80 |
| 2013/0242062 A1* | 9/2013 | Ming | H04N 13/0409 348/51 |

FOREIGN PATENT DOCUMENTS

| JP | A-2005-099588 | 4/2005 |
| JP | A-2006-227143 | 8/2006 |

* cited by examiner

*Primary Examiner* — Sultan Chowdhury
*Assistant Examiner* — Magda Cruz
(74) *Attorney, Agent, or Firm* — Oliff PLC (57) ABSTRACT

A projector includes an electricity reception terminal to which electric power is supplied via an electricity feed terminal, a projection section that includes a light source, a spatial light modulator, an irradiation system, and a projection system and projects light, and a control section that switches a content to another whenever electric power supply to the electricity reception terminal is initiated and causes the projection section to project light carrying an image related to the content selected in the switching operation.

6 Claims, 4 Drawing Sheets

PROJECTOR AND METHOD FOR CONTROLLING PROJECTOR WITH CHANGING CONTENT

The entire disclosure of Japanese Patent Application No. 2013-152319, filed Jul. 23, 2013 is expressly incorporated by reference herein.

BACKGROUND

1. Technical Field

The present invention relates to a projector that projects light and a method for controlling the projector.

2. Related Art

There is a known projector of related art that is fixed to a socket for a lighting apparatus or any other electricity feed terminal and receives electric power supplied through the electricity feed terminal (see JP-A-2005-99588 and JP-A-2006-227143, for example).

In general, a projector can handle a plurality of contents and selectively project an image related to a content.

The projector described above, which is characterized in that it receives electric power supplied through the electricity feed terminal, can improve user's satisfaction and convenience if the projector allows the user to readily switch a content to another.

SUMMARY

An advantage of some aspects of the invention is to provide a projector capable of readily switching a content related to a projected image to another content and a method for controlling the projector.

An aspect of the invention relates to a projector including an electricity reception terminal, a projection section that projects light, and a control section that switches a content to another when electric power supply to the electricity reception terminal is initiated and causes the projection section to project light carrying an image related to the content selected in the switching operation.

According to the configuration described above, a content related to a projected image can be switched to another content by switching electric power supply to the electricity reception terminal between ON and OFF, whereby the switching can be readily performed.

In the aspect of the invention described above, a content may include a temporally changing content so reproduced that a projected image changes with elapsed time. When a content related to a temporally changing content is reproduced and the reproduction is stopped, the control section may store a stop position where the reproduction stops, and when the content is reproduced again in response to initiation of electric power supply to the electricity reception terminal, the control section may initiate the reproduction of the content from the stored stop position and cause the projection section to project light carrying an image related to the content.

According to the configuration described above, when the selected content is reproduced in response to initiation of electric power supply to the electricity reception terminal, the projector initiates the reproduction from the position where the reproduction stopped last time. As a result, to initiate reproduction of the selected content from the stop position where the reproduction stopped last time, the user does not need to perform special operation, which improves the convenience of the user.

In the aspect of the invention described above, a content may include a reproduction end content so reproduced that the reproduction ends under a predetermined condition, and when reproduction of a content related to a reproduction end content ends although electric power keeps being supplied to the electricity reception terminal, the control section may switch the content to another and cause the projection section to project light carrying an image related to the content selected in the switching operation.

According to the configuration described above, when reproduction of a content ends although electric power keeps being supplied to the electricity reception terminal, the content is switched to another without user's operation of switching electric power supply to the electricity reception terminal between ON and OFF or user's instruction of switching the content to another. As a result, after reproduction of a content ends, the user does not need to perform special operation in order to reproduce a new content, whereby the convenience of the user is improved.

In the aspect of the invention described above, after electric power supply to the electricity reception terminal is terminated and then electric power supply to the electricity reception terminal is initiated within a predetermined period, the control section may perform the content switching.

According to the configuration described above, the content switching is performed only when electric power supply to the electricity reception terminal is switched between ON and OFF in a short period, that is, the switching described above is intentionally performed in order to perform content switching. As a result, unnecessarily content switching is avoided.

Another aspect of the invention relates to a method for controlling a projector including an electricity reception terminal and a projection section that projects light, the method including switching a content to another when electric power supply to the electricity reception terminal is initiated and causing the projection section to project light carrying an image related to the content selected in the switching operation.

According to the control method, a content related to a projected image can be switched to another content by switching electric power supply to the electricity reception terminal between ON and OFF, whereby the switching can be readily performed.

Still another aspect of the invention relates to a projector including an electricity reception terminal, a detection section that detects that electric power supply to the electricity reception terminal is initiated, a content switch section that switches a content to another when the detection section detects that electric power supply to the electricity reception terminal is initiated, a content reproduction section that reproduces the content selected in the switching operation performed by the content switch section, and a projection section that projects light carrying an image related to the content reproduced by the content reproduction section.

According to the configuration described above, a content related to a projected image can be switched to another content by switching electric power supply to the electricity reception terminal between ON and OFF, whereby the switching can be readily performed.

A content related to a projected image can readily be switched to another content.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Figure 1A:
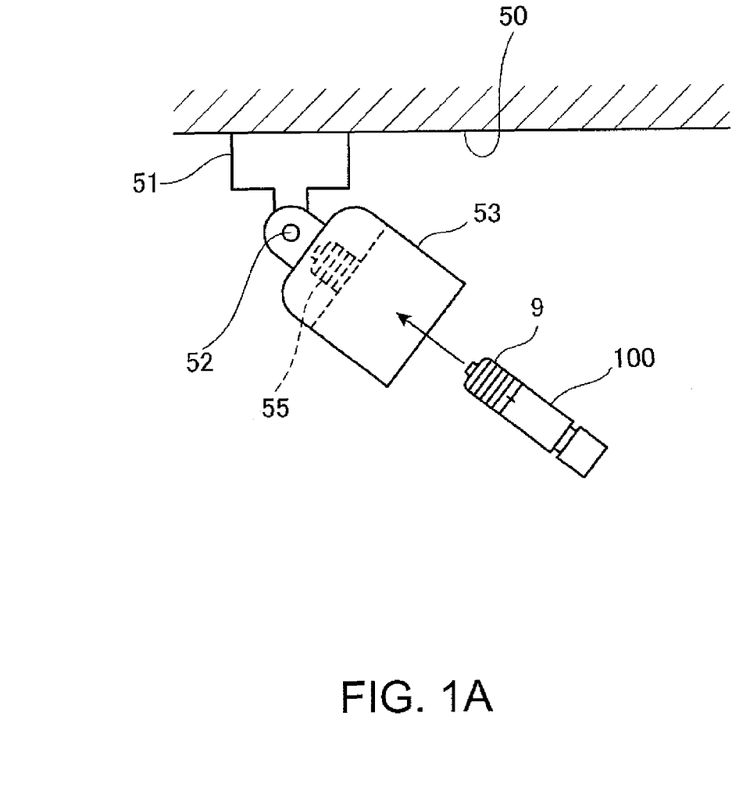
FIGS. 1A and 1B show how to use a projector according to an embodiment.
Figure 1B:
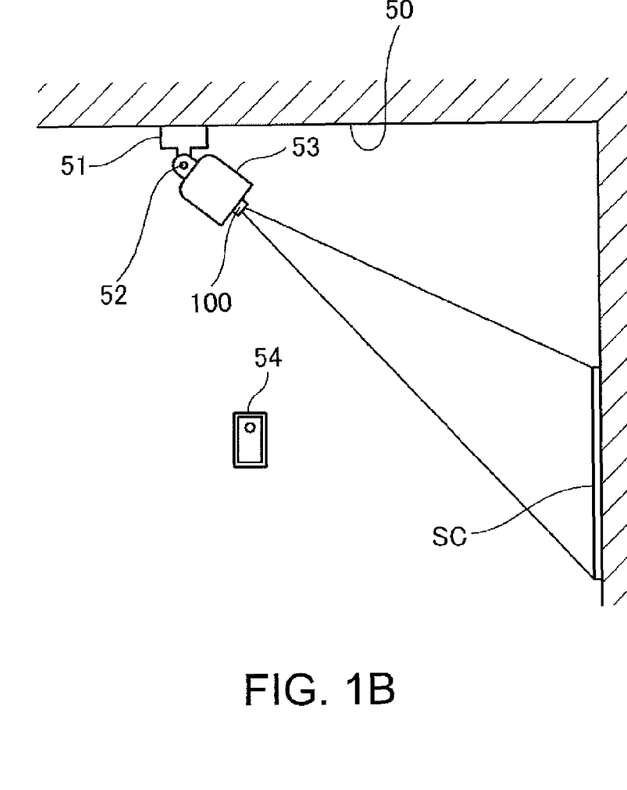

FIGS. 1A and 1B show how to use a projector 100 according to the present embodiment.

The projector 100 is a projection-type projector that is attached to a ceiling in a restaurant, a class room, an office, or any other room and projects image light from the position where the projector is attached to display an image on a screen SC.

In detail, a fixing portion 51 is fixed to a ceiling surface 50 in a predetermined position, and an attachment cover 53 is so attached to the fixing portion that the attachment cover 53 is pivotal around a shaft 52 relative to the fixing portion 51, as shown in FIGS. 1A and 1B.

An electricity feed terminal 55 is provided in the attachment cover 53, and electric power is supplied from an electric power supply line (not shown) to the electricity feed terminal 55, as shown in FIG. 1A. A switch 54 (FIG. 1B) provided on a wall of a room can switch electric power supply to the electricity feed terminal 55 between ON and OFF.

The electricity feed terminal 55 is a light bulb base socket shaped into a female thread. An electricity reception terminal 9 shaped into a male thread is provided at an end portion of the projector 100. When the electricity reception terminal 9 is threaded into the electricity feed terminal 55, the terminals are physically (mechanically) and electrically connected to each other. The connected terminals allow electric power to be supplied to the projector 100.

The projector 100 projects image light on the screen SC provided on a wall of a room to display an image based on the image light on the screen SC, as shown in FIG. 1B.

How to use the projector 100 shown in FIGS. 1A and 1B is presented only by way of example. For example, the projector 100 is not necessarily attached to a ceiling and may be attached to a wall, a floor, or a dedicated lane. Further, the projector 100 is not necessarily installed indoors and may be installed outdoors.

Further, the electricity reception terminal 9 is not necessarily shaped into a male thread. For example, the electricity reception terminal 9 may be a plug-type terminal to be connected to a power receptacle or a terminal having a predetermined shape that allows electrical connection to an electric power line on a lighting duct. That is, the electricity reception terminal 9 only needs to be a terminal to which electric power is supplied irrespective of the shape thereof and the form of connection to an electricity feed terminal.

Figure 2:
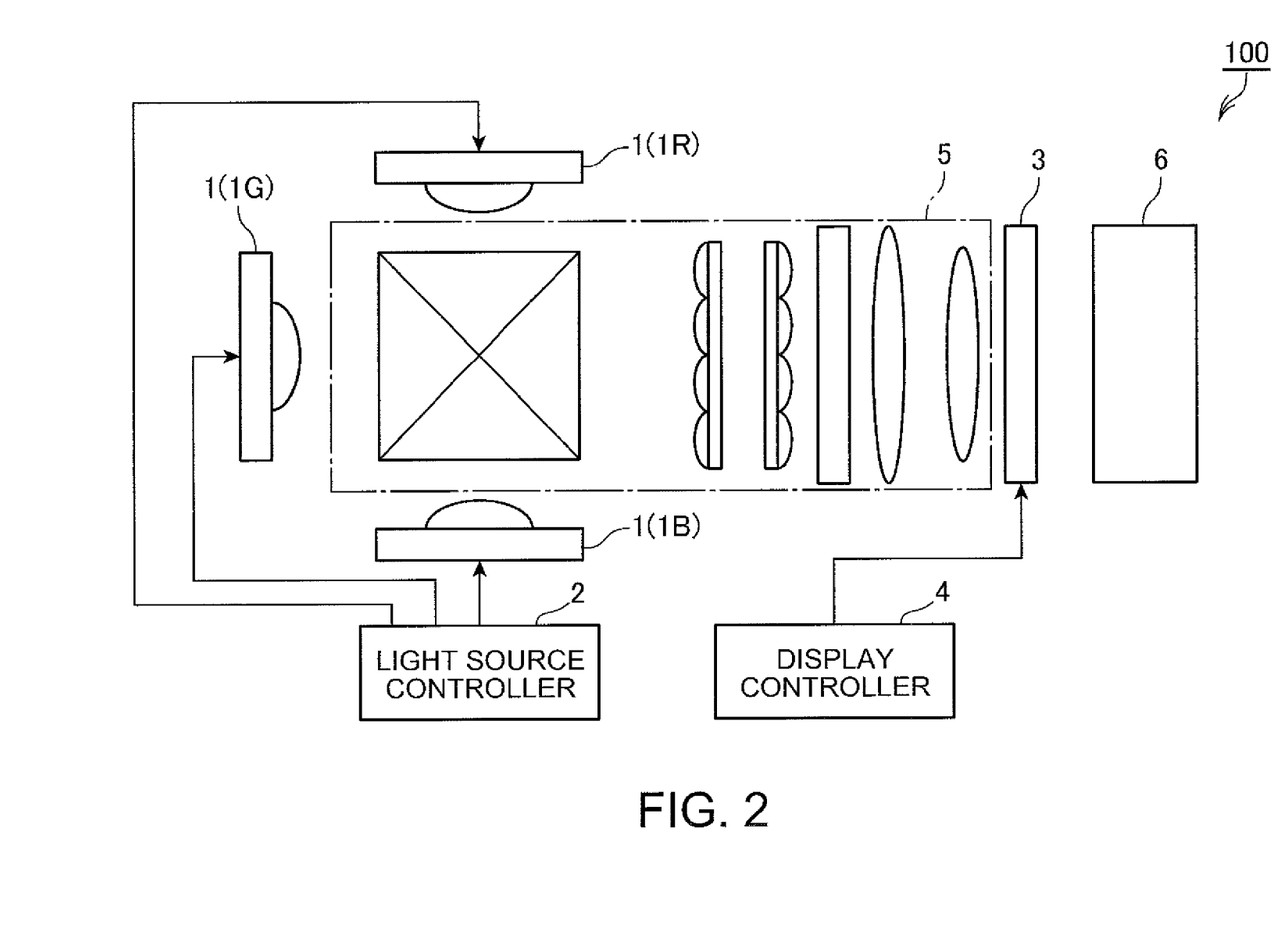
FIG. 2 shows the configuration of the projector.

FIG. 2 shows the configuration of the projector 100 according to the present embodiment.

As shown in FIG. 2, the projector 100 includes a light source 1, a light source controller 2, which drives the light source 1, a spatial light modulator 3, which modulates light from the light source 1, a display controller 4, which writes an image to the spatial light modulator 3, an irradiation system 5, which is so provided that the spatial light modulator 3 is irradiated with the light from the light source 1, and projection system 6, which projects modulated light from the spatial light modulator 3.

In the present embodiment, the light source 1, the spatial light modulator 3, the irradiation system 5, and the projection system 6 cooperate with each other as a "projection section."

The light source 1 includes an LED corresponding to R (red light), an LED corresponding to G (green light), and an LED corresponding to B (blue light). The R, G, and B are an example of a combination of typical element colors for full color image display. The light source 1 in the present embodiment therefore includes the three LEDs corresponding to the three element colors different from each other. In other embodiments, however, the light source 1 may include LEDs corresponding to four or more element colors different from each other or may include LEDs corresponding to two element colors different from each other. Further, the light source 1 may include organic or inorganic semiconductor lasers, organic EL (electro-luminescent) devices, or fluorophores excited by LED or laser light sources in place of the LEDs.

The irradiation system 5 includes a dichroic prism that combines optical paths of light (light beams) from the RGB light sources 1R, 1G, and 1B, an optical integration system having a fly's eye lens, and a polarization conversion element that aligns the polarization directions of the light beams having exited out of the optical integration system with each other to form light beams having a single polarization direction.

The spatial light modulator 3 is a single-plate transmissive liquid crystal light valve. The liquid crystal light valve in the present embodiment includes a pair of polarizers and a liquid crystal panel positioned therebetween.

Figure 3:
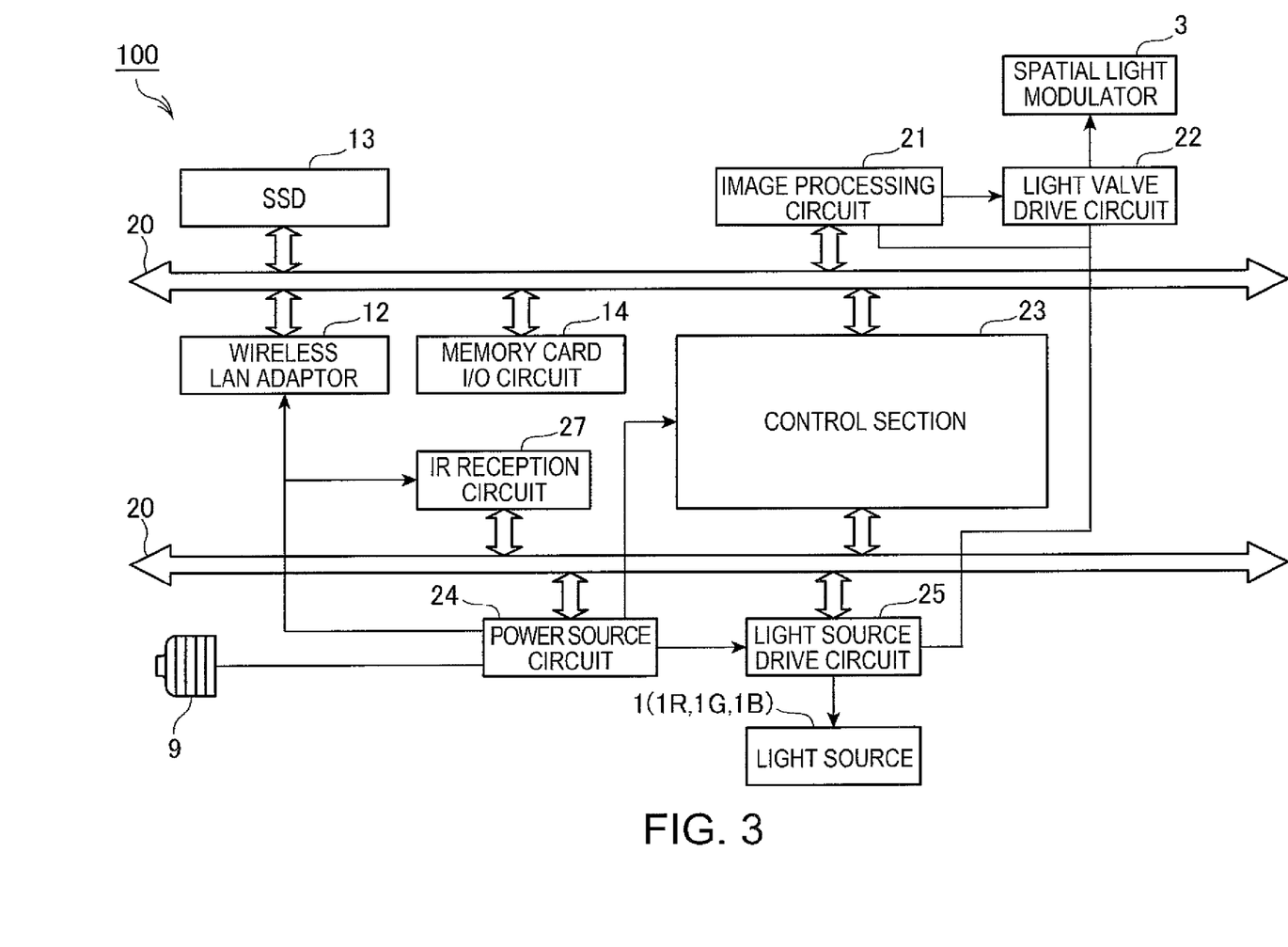
FIG. 3 is a block diagram showing a functional configuration of the projector.

FIG. 3 is a block diagram showing a functional configuration of the projector 100.

The projector 100 includes the electricity reception terminal 9, a power source circuit 24, and a control section 23, as shown in FIG. 3.

The electricity reception terminal 9 receives electric power that allows the projector 100 to function from an external power source through the electricity feed terminal 55 and outputs the electric power to the power source circuit 24. The electric power supplied to the electricity reception terminal 9 may be AC or DC electric power. The power source circuit 24 supplies each portion of the projector 100 with the electric power.

The control section 23 includes a CPU, a ROM, a RAM, a nonvolatile memory, a system controller, and other circuits and controls each portion of the projector 100. The nonvolatile memory stores operating software and application software for achieving functions that will be described later, and the ROM stores a BIOS.

Further, the following components are connected to the control section 23 via a bus 20 as shown in FIG. 3: a wireless LAN adaptor 12; an SSD (solid state drive) 13; a memory card I/O (input/output) circuit 14; an image processing circuit 21; a light valve drive circuit 22; the power source circuit 24; a light source drive circuit 25; and an IR reception circuit 27.

The wireless LAN adaptor 12 performs communication in compliance with a wireless LAN communication standard under the control of the control section 23. The projector 100 can use the wireless LAN adaptor 12 to communicate, for example, with a server computer, a personal computer, a smartphone, and a tablet computer (neither of them is shown) external to the projector 100 and can project an image based on data stored in any of the apparatus described above.

The SSD 13 is formed of a flash memory, which is a nonvolatile memory, and a flash drive that reads data from and writes data to the flash memory. The SSD 13 stores a variety of data in a nonvolatile, rewritable manner under the control of the control section 23.

The memory card I/O circuit 14 reads data from and writes data to a memory card inserted into a dedicated card slot under the control of the control section 23.

The flash memory associated with the SSD 13 and the memory card associated with the memory card I/O circuit 14 can store content data (which will be described later) related to an image projected by the projector 100. The stored image-related content data can be overwritten based on communication via the wireless LAN adaptor 12 over an external network.

In the present embodiment, an "image" is defined as a term encompassing still images and motion images. Still images also include images that change with time, such as images used in a slideshow file.

In the present embodiment, a content means a series of still images or motion images related to a single subject, such as a movie, a music video, and a slideshow file for a presentation. In a configuration in which a signal is inputted from an external apparatus, an inputted still image (still image representing desktop, for example) and motion images are each handled as a content.

In particular, in the present embodiment, a temporally changing content and a reproduction end content are examples of the content.

A temporally changing content is a reproducible (playable) content so reproduced (played) that an image related to the content projected on the screen SC changes with time. A temporally changing content corresponds, for example, to motion images and a slideshow file.

A reproduction end content is a reproducible (playable) content so reproduced (played) that the reproduction (playing) ends under a predetermined condition. The phrase "the reproduction ends under a predetermined condition" means, for example, that reproduction of a content related to motion images ends after all reproducible portions are reproduced, and that reproduction of a slideshow file in which a slide is automatically switched to another ends after all slides are outputted. It is noted that reproduction of a content may end under any condition.

Further, the content data is data in a predetermined file format, such as JPEG and MPEG file formats, and formed of original data based on which an image (still image, motion images) related to the content is projected.

An image related to a content is an image produced by image light based on content data on the content or an external signal and displayed on the screen SC.

The image processing circuit 21 converts the resolution of a source image, performs color correction and trapezoidal correction on the source image, and outputs the resultant image to the light valve drive circuit 22 under the control of the control section 23. The light valve drive circuit 22 outputs a drive signal to the spatial light modulator 3 to cause the spatial light modulator 3 to modulate light based on the input from the image processing circuit 21. The control section 23, the image processing circuit 21, and the light valve drive circuit 22 cooperate with each other to function as the display controller 4.

The light source drive circuit 25 outputs drive signals to the RGB light sources 1R, 1G, and 1B to drive the light sources under the control of the control section 23. The control section 23 and the light source drive circuit 25 cooperate with each other to function as the light source controller 2.

The action of the thus configured projector 100 will next be described.

Figure 4:
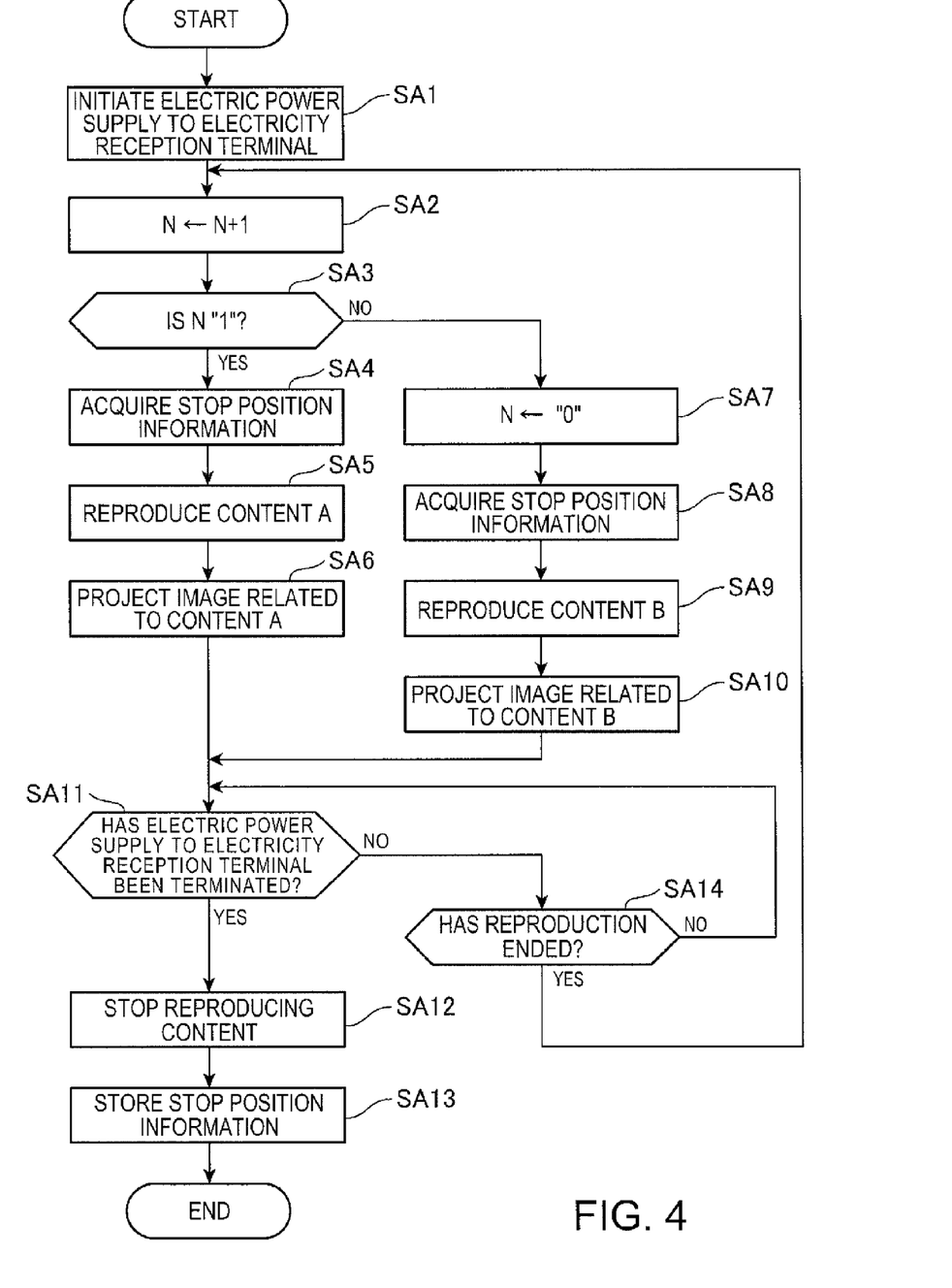
FIG. 4 is a flowchart showing the action of the projector.

FIG. 4 is a flowchart showing the action of the projector 100 after electric power supply to the electricity reception terminal 9 is initiated.

It is assumed in the following description that the flash memory in the SSD 13 stores content data DA on a content A and content data DB on a content B, which differs from the content A. Each of the contents A and B is not only the reproduction end content but also the temporally changing content described above.

It is also assumed in the following description that images are projected based on the contents A and B. As will be clearly shown later, the projector 100 switches one of the contents A and B to the other under a predetermined condition, and a user can select in advance a content to be switched.

After electric power supply to the electricity reception terminal 9 is initiated (step SA1), the control section 23 processes a variable N in such a way that the value of an integer held in the variable N is incremented (step SA2), as shown in FIG. 4.

The variable N is a variable that can hold an integer. The variable N has an integer holding storage area provided in the flash memory or any other nonvolatile memory in the SSD 13. Therefore, even when electric power supply to the electricity reception terminal 9 is terminated, the integer held in the variable N is retained. The variable N may be a variable defined in a program that provides the function of the control section 23 or may be independent data that the program can refer to.

Consider a case where the content B was reproduced last time and the reproduction of the content B stopped because electric power supply to the electricity reception terminal 9 was terminated. The value of the integer held in the variable N is "0" when the process procedure proceeds to step SA2, as will be clearly shown later. Therefore, after the process in step SA2 is carried out, an integer of "1" is held in the variable N. On the other hand, consider a case where the content A was reproduced last time and the reproduction of the content A stopped because electric power supply to the electricity reception terminal 9 was terminated. The value held in the variable N is "1" when the process procedure proceeds to step SA2, as will be clearly shown later. Therefore, after the process in step SA2 is carried out, an integer of "2" is held in the variable N.

After the variable N is incremented, the control section 23 causes the process procedure to proceed to step SA3.

In step SA3, the control section 23 determines whether or not the value of the variable N is "1".

When the value of the variable N is "1" (step SA3: YES), the control section 23 acquires stop position information on the position where the content A stopped (step SA4). The stop position information represents a position in a temporally changing content. Assuming that the content is reproduced last time and the reproduction stops, the stop position information represents the position where the reproduction of the content stops. The stop position information is appropriately configured in accordance with the data format of content data on the content. In the present embodiment, each content related to a temporally changing content is stored in relation to the stop position information associated therewith.

The control section 23 then initiates reproduction of the content A based on the content data DA on the content A from the stop position indicated by the acquired stop position information (step SA5) and projects an image related to the reproduced content A on the screen SC (step SA6).

Specifically, the control section 23 drives the RGB light sources 1R, 1G, and 1B and writes an image to the spatial light modulator 3 at appropriate timing based on the content data DA stored in the SSD 13. As a result, the light beams from the RGB light sources 1R, 1G, and 1B are modulated in accordance with the image written to the spatial light modulator 3, projected through the projection system 6, and displayed on the screen SC based on image light formed of the modulated light beams.

The control section 23 then causes the process procedure to proceed to step SA11.

As described above, when the content B was reproduced last time and the reproduction stopped because electric power supply to the electricity reception terminal 9 was terminated, the process procedure proceeds to step SA4 as a result of the determination in step SA3, and the reproduction of the content A is initiated. That is, the control section 23 switches the content to be reproduced from the content B to the content A.

Further, in the present embodiment, after the content B is switched to the content A, the content A is reproduced from the position where the reproduction thereof stopped last time. As a result, to initiate reproduction of the content A selected in the switching operation from the position where the reproduction thereof stopped last time, the user does not need to perform specific operation, which improves the convenience of the user.

On the other hand, when the value of the variable N is not "1" (step SA3: NO), the control section 23 substitutes "0" into the variable N (step SA7). The control section 23 then acquires the stop position information associated with the content B (step SA8). The control section 23 then initiates reproduction of the content B based on the content data DE on the content B from the stop position indicated by the acquired stop position information (step SA9) and projects an image related to the reproduced content B on the screen SC (step SA10).

The control section 23 then causes the process procedure to proceed to step SA11.

As described above, when the content A was reproduced last time and the reproduction stopped because electric power supply to the electricity reception terminal 9 was terminated, the process procedure proceeds to step SA7 as a result of the determination in step SA3, and the reproduction of the content B is initiated. That is, the control section 23 switches the content to be reproduced from the content A to the content B. Further, in the present embodiment, after the content A is switched to the content B, the content B is reproduced from the position where the reproduction thereof stopped last time. As a result, to initiate reproduction of the content B selected in the switching operation from the position where the reproduction thereof stopped last time, the user does not need to perform specific operation, which improves the convenience of the user.

In step SA11, the control section 23 determines whether or not electric power supply to the electricity reception terminal 9 has been terminated. When the supply has been terminated (step SA11: YES), the control section 23 stops reproducing the content being reproduced (step SA12), acquires the position where the reproduction is stopped, relates the acquired stop position as the stop position information to the content data on the content the reproduction of which has been stopped, and stores the stop position information related to the content data (step SA13).

On the other hand, the determination result in step SA11 shows that the electric power supply to the electricity reception terminal 9 has not been terminated (step SA11: NO), the control section 23 determines whether or not the reproduction of the content being reproduced has ended (step SA14). When the reproduction has not ended (step SA14: NO), the control section 23 causes the process procedure to return to step SA11. That is, the control section 23, after it initiates reproduction of a content, monitors not only whether or not the electric power supply to the electricity reception terminal 9 has been terminated but also whether or not the reproduction of the content has ended.

On the other hand, when reproduction of a content being reproduced ends before the electric power supply to the electricity reception terminal 9 is terminated (step SA14: YES), the control section 23 causes the process procedure to return to step SA2. As a result, the variable N is incremented, and when the determination result in step SA14 shows that the content B was reproduced and the reproduction ended, reproduction of the content A is initiated. On the other hand, when the determination result in step SA14 shows that the content A was reproduced and the reproduction ended, reproduction of the content B is initiated. As described above, in the present embodiment, when reproduction of a content ends although electric power keeps being supplied to the electricity reception terminal 9, the content is switched to another without user's operation of switching electric power supply to the electricity reception terminal 9 between ON and OFF or user's instruction of switching the content to another. As a result, after reproduction of a content ends, the user does not need to perform special operation in order to reproduce a new content, whereby the convenience of the user is improved.

As described above, the control section 23 in the projector 100 according to the present embodiment switches a content to another whenever electric power supply to the electricity reception terminal 9 is initiated (when the electric power supply is initiated) and causes the projection section to project light carrying an image related to the content selected in the switching operation.

According to the configuration described above, the user can switch a content related to a projected image to another content by switching electric power supply to the electricity reception terminal 9 between ON and OFF, that is, in the present embodiment, by simply switching the state of the switch 54 between ON and OFF. As a result, switching a content to another can be readily performed.

Further, in the present embodiment, when a content related to a temporally changing content is reproduced and then the reproduction is stopped, the control section 23 stores the stop position related to the reproduction. Thereafter, to select and reproduce the content again in response to initiation of electric power supply to the electricity reception terminal 9, the control section 23 initiates the reproduction of the content from the stored stop position and causes the projection section to project light carrying an image related to the content.

According to the configuration described above, when the selected content is reproduced in response to initiation of electric power supply to the electricity reception terminal 9, the projector 100 initiates the reproduction from the position where the reproduction stopped last time. As a result, to initiate reproduction of the selected content from the stop position where the reproduction stopped last time, the user does not need to perform special operation, which improves the convenience of the user.

Further, in the present embodiment, when reproduction of a content related to a reproduction end content ends although electric power keeps being supplied to the electricity reception terminal 9, the control section 23 switches the content to another and causes the projection section to project light carrying an image related to the content selected in the switching operation.

According to the configuration described above, when reproduction of a content ends although electric power keeps being supplied to the electricity reception terminal 9, the content is switched to another without user's operation of switching electric power supply to the electricity reception terminal 9 between ON and OFF or user's instruction of switching the content to another. As a result, after reproduction of a content ends, the user does not need to perform special operation in order to reproduce a new content, whereby the convenience of the user is improved.

The embodiment described above merely represents an aspect of the invention and can be arbitrarily changed and applied within the scope of the invention.

In the embodiment described above, the control section 23 in the projector 100 consistently switches a content to another when electric power supply to the electricity reception terminal 9 is initiated. The configuration may be so changed that the control section 23 switches a content to another when the elapsed period from the time when the electric power supply is terminated last time to the time when the electric power supply is initiated falls within a predetermined period T1.

For example, the projector 100 may be provided with an RTC (real time clock, not shown) to which electric power is supplied from a backup power supply. When electric power supply to the electricity reception terminal 9 is terminated, the control section 23 stores data representing time (assumed to be expressed down to digit of second in the present example) in the flash memory or any other nonvolatile memory based on an input from the RTC. Thereafter, when electric power supply to the electricity reception terminal 9 is initiated, the control section 23 acquires time based on an input from the RTC, compares the acquired time with the time indicated by the stored data (time when electric power supply was terminated), and calculates an elapsed period. The control section 23 then compares the calculated elapsed period with the predetermined period T1 to make the content switching determination described above. The determination may be made by using any method other than the method shown in the example described above.

In the configuration described above, the control section 23 determines whether or not the user has intentionally operated the switch 54 in a short period to switch electric power supply to the electricity reception terminal 9 between ON and OFF in order to switch a content to another. That is, the user is notified in a predetermined way that a content is switched to another when electric power supply to the electricity reception terminal 9 is switched between ON and OFF within the predetermined period T1. The user who desires to switch a content to another then quickly operates the switch 54. As a result, not only can a content be desirably switched to another in simple operation, but also a situation in which a content is unnecessarily switched to another despite user's intention in response to operation of the switch 54 is avoided.

Further, in the embodiment described above, the control section 23 in the projector 100 switches one of the two contents A and B to the other in response to initiation of electric power supply to the electricity reception terminal 9. The number of contents involved in the switching operation may instead be three or more. In this case, the user can set a content switching order in advance. The configuration described above allows efficient content switching in response to the switching operation of electric power supply to the electricity reception terminal 9 between ON and OFF, whereby the user can smoothly switch to a desired content.

Further, the structure in which the projector 100 projects light has been specifically described with reference to FIGS. 2 and 3, but the structure that allows light projection is not limited to that having been described by way of example. That is, the invention is applicable to any projector including an electricity reception terminal and a projection section that projects light.

Further, each functional portion of the projector 100 shown in FIGS. 2 and 3 shows a functional configuration achieved by cooperation between hardware and software and is not necessarily implemented in a specific form. It is therefore not necessary to implement separate hardware corresponding to each functional portion, and a single processor can, of course, execute a program to achieve functions of a plurality of functional portions. Further, in the embodiment described above, part of a function achieved by software may be achieved by hardware, or part of a function achieved by hardware may be achieved by software. In addition, a specific detailed configuration of each of the other portions of the projector 100 can be arbitrarily changed to the extent that the change does not depart from the substance of the invention.

In the present embodiment, the control section 23 that carries out steps SA1 and SA11 to detect the state of electric power supply to the electricity reception terminal 9 corresponds to a detection section. The control section 23 that carries out step SA2 to change the variable N corresponding to a content corresponds to a content switch section. The control section 23 that carries out steps SA5 and SA9 to reproduce a content selected in switching operation corresponds to a content reproduction section. The control section 23 that carries out step SA12 to stop reproducing a content being reproduced corresponds to a content stop section.

What is claimed is:

1. A projector comprising:
an electricity reception terminal;
a projection section that projects light carrying an image related to a content; and
a control section that switches the content from a first content previously projected to a second content different from the first content when electric power supply to the electricity reception terminal is initiated and causes the projection section to project light carrying an image related to the second content selected in the switching operation.

2. The projector according to claim 1, wherein a content includes a temporally changing content so reproduced that a projected image changes with elapsed time, when a content related to a temporally changing content is reproduced and the reproduction is stopped, the control section stores a stop position where the reproduction stops, and when the content is reproduced again in response to initiation of electric power supply to the electricity reception terminal, the control section initiates the reproduction of the content from the stored stop position and causes the projection section to project light carrying an image related to the content.

3. The projector according to claim 1, wherein a content includes a reproduction end content so reproduced that the reproduction ends under a predetermined condition, and when reproduction of a content related to a reproduction end content ends although electric power keeps being supplied to the electricity reception terminal, the control section switches the content to another and causes the projection section to project light carrying an image related to the content selected in the switching operation.

4. The projector according to claim 1, wherein after electric power supply to the electricity reception terminal is terminated and then electric power supply to the electricity reception terminal is initiated within a predetermined period, the control section performs the content switching.

5. A method for controlling a projector including an electricity reception terminal and a projection section that projects light carrying an image related to a content, the method comprising:
  switching the content from a first content previously projected to a second content different from the first content when electric power supply to the electricity reception terminal is initiated and causing the projection section to project light carrying an image related to the second content selected in the switching operation.

6. A projector comprising:
  an electricity reception terminal;
  a detection section that detects that electric power supply to the electricity reception terminal is initiated;
  a content switch section that switches from a first content previously projected to a second content different from the first content when the detection section detects that electric power supply to the electricity reception terminal is initiated;
  a content reproduction section that reproduces the second content selected in the switching operation performed by the content switch section; and
  a projection section that projects light carrying an image related to the second content reproduced by the content reproduction section.

* * * * *